United States Patent
Schwing et al.

(10) Patent No.: US 11,893,026 B2
(45) Date of Patent: Feb. 6, 2024

(54) ADVANCED MULTIPROVIDER OPTIMIZATION

(71) Applicant: SAP SE, Walldorf (DE)

(72) Inventors: Julian Schwing, Mannheim (DE); Christoph Weyerhaeuser, Heidelberg (DE); Johannes Merx, Heidelberg (DE); Davide Corradi, Heidelberg (DE); Timo Hochberger, Heidelberg (DE)

(73) Assignee: SAP SE, Walldorf (DE)

( * ) Notice: Subject to any disclaimer, the term of this patent is extended or adjusted under 35 U.S.C. 154(b) by 348 days.

(21) Appl. No.: 16/372,951

(22) Filed: Apr. 2, 2019

(65) Prior Publication Data

US 2020/0320082 A1 Oct. 8, 2020

(51) Int. Cl.
| | |
|---|---|
| G06F 16/2453 | (2019.01) |
| G06F 16/2455 | (2019.01) |
| G06F 16/22 | (2019.01) |
| G06F 16/25 | (2019.01) |
| G06F 16/21 | (2019.01) |

(52) U.S. Cl.
CPC ...... *G06F 16/24561* (2019.01); *G06F 16/217* (2019.01); *G06F 16/2282* (2019.01); *G06F 16/24544* (2019.01); *G06F 16/256* (2019.01)

(58) Field of Classification Search
CPC .... G06F 16/244; G06F 16/278; G06F 16/283; G06F 16/285; G06F 16/24544; G06F 16/2456; G06F 16/24553; G06F 16/24542; G06F 16/2453; G06F 16/211; G06F 16/217; G06F 16/2365; G06F 16/2282
See application file for complete search history.

(56) References Cited

U.S. PATENT DOCUMENTS

| | | | |
|---|---|---|---|
| 10,095,717 B2* | 10/2018 | Herbst | G06F 16/258 |
| 2006/0195416 A1* | 8/2006 | Ewen | G06F 16/2471 |
| 2016/0204916 A1* | 7/2016 | Dao | H04L 45/02 |
| | | | 709/226 |
| 2016/0292167 A1* | 10/2016 | Tran | G06F 16/24542 |
| 2016/0350374 A1* | 12/2016 | Weyerhaeuser | G06F 16/285 |

* cited by examiner

*Primary Examiner* — Marcin R Filipczyk
(74) *Attorney, Agent, or Firm* — Mintz Levin Cohn Ferris Glovsky and Popeo, P.C.

(57) ABSTRACT

A calculation engine of a database management system is described that determines a multiprovider includes a first data source and a second data source that each require different approaches for operation optimization. The calculation engine can split the multiprovider into a first node corresponding to a first operation compatible with the first data source and a second node corresponding to a second operation compatible with the second data source. The calculation engine can perform the first operation at the first data source to produce a first result and perform the second operation at the second data source to produce a second result. The calculation engine can then merge the first result and the second result according to a third operation, and perform such third operation at the first data source.

12 Claims, 5 Drawing Sheets

ADVANCED MULTIPROVIDER OPTIMIZATION

TECHNICAL FIELD

The subject matter described herein relates to splitting a multiprovider based on underlying data sources and joining results from such splitting to thereby optimize processing of a query.

BACKGROUND

Calculation scenarios can consist of one or more multiproviders. A multiprovider is a special union operation combined with aggregation function(s), enhanced column mapping (constant mapping) information, and specialized filter processing. When executed, the multiprovider aggregates a plurality of part providers for data. For example, some large companies can have multiproviders consisting of hundreds of part providers. A part provider may, in some examples, be or include a semantic table partition that holds data (e.g., data for a specific accounting year and/or a specific account region).

SUMMARY

Systems, methods, and articles of manufacture, including computer program products, are provided for reclaiming memory resources. In one aspect, there is provided a system. The system may include at least one data processor and at least one memory. The at least one memory may store instructions that result in operations when executed by the at least one data processor. The operations may include: determining, by a calculation engine of a database management system, a calculation scenario including operations of a multiprovider, the multiprovider including a first data source and a second data source, the first data source and the second data source each requiring different approaches for optimization of the operations; splitting, by the calculation engine, the multiprovider into a first node and a second node, the first node corresponding to a first operation performable using a first optimization strategy compatible with the first data source, and the second node corresponding to a second operation performable using a second optimization strategy compatible with the second data source; performing, by the calculation engine, the first operation at the first data source to produce a first result; performing, by the calculation engine, the second operation at the second data source to produce a second result; merging, by the calculation engine and corresponding to a third operation, the first result and the second result; and performing the third operation at the first data source.

In some variations, one or more features disclosed herein including the following features may optionally be included in any feasible combination. The first data source may include a HANA data source. The second data source may include a SDA data source. The first operation may include a hierarchies join and a FEMS filter.

In some variations, the second operation may include operations performed at a first sub-node and a second sub-node. The first sub-node may correspond to a hierarchy join compatible with the second data source and the second sub-node may correspond to data aggregation and a FEMS filter compatible with the second data source.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to sharing access to data from a cloud-based analytics engine, it should be readily understood that such features are not intended to be limiting. The claims that follow this disclosure are intended to define the scope of the protected subject matter.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The generation and processing of intermediate results in a calculation engine can require additional computation time and result in unnecessary slowdown of the execution of queries. The current subject matter is directed to processing calculation scenarios such that intermediate results are limited, which can advantageously result in decreased processing time. For example, in some embodiments, a calculation engine is described that determines that a multiprovider involved in a calculation scenario includes a first data source and a second data source that each require different approaches for optimizing operations. The calculation engine can split the multiprovider into a first node corresponding to a first operation compatible with the first data source and a second node corresponding to a second operation compatible with the second data source. The calculation engine can perform (or cause to be performed) the first operation at the first data source to produce a first result and perform (or cause to be performed) the second operation at the second data source to produce a second result. The calculation engine can then merge (or cause to be merged) the first result and the second result according to a third operation, and perform (or cause to be performed) such third operation at the first data source.

Figure 1:
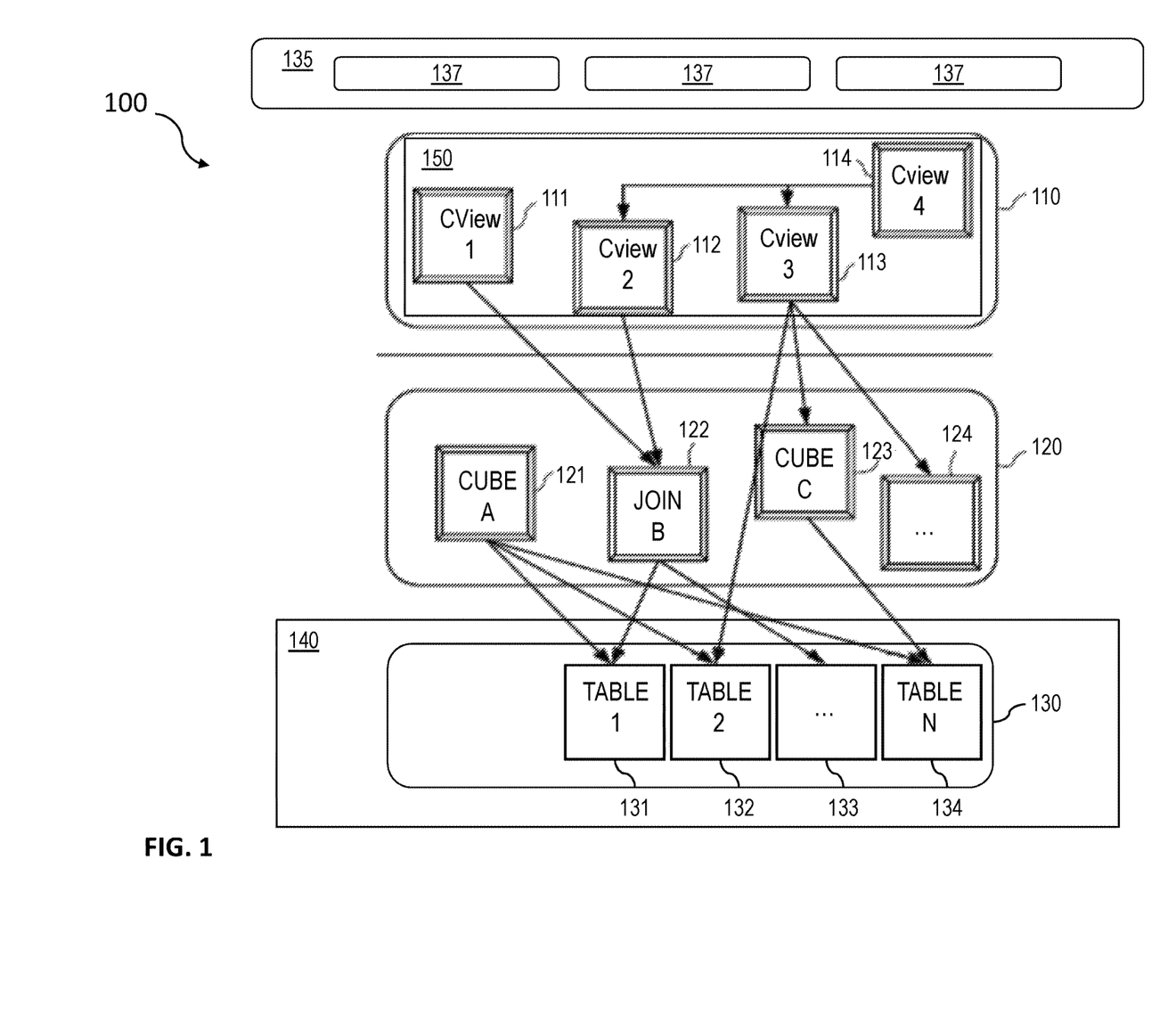
FIG. 1 is a diagram illustrating a computer architecture including a database system that includes three layers.

FIG. 1 is a diagram that illustrates a computing architecture 100 including a database system that includes three layers: a calculation engine layer 110, a logical layer 120, and a physical table-pool 130. One or more application servers 135 implementing database client applications 137 may access the database system. Calculation scenarios may be executed by a calculation engine, which may form part of a database or which can be part of the calculation engine layer 110 (which is associated with the database). The calculation engine layer 110 can be based on and/or interact with the other two layers, the logical layer 120 and/or the physical table pool 130. The basis of the physical table pool 130 consists of physical tables (called indexes) containing the data, which can be stored on one or more database servers 140. Various tables 131-134 can be joined using logical metamodels 121-124 defined by the logical layer 120 to form an index. For example, the tables 131-134 in the illustrated Cube$_A$ metamodel 121 (e.g., an online analytical processing or "OLAP" index or other type of data structure) can be assigned roles (e.g., fact or dimension tables) and be joined to form a star schema or other type of schema. It is also possible to form join indexes (e.g. the Join$_B$ metamodel 122 in FIG. 1), which can act like database views in computing environments, such as the Fast Search Infrastructure (FSI) available from SAP SE of Walldorf, Germany.

As stated above, a calculation scenario 150 can include individual nodes 111-114 (e.g., calculation views), which in turn each define operations such as joining various physical or logical indexes and other calculation views (e.g., the CView$_4$ node 114 is illustrated as a join of the CView$_2$ node 112 and the CView$_3$ node 113). That is, the input for a node 111-114 can be one or more of a relational operation, a non-relational operation, or another node 111-114.

In a calculation scenario 150 and/or calculation view node 111-114, two different representations can be provided including a pure calculation scenario in which all possible attributes are given and an instantiated model (also referred to herein as "optimized calculation scenario") that contains only the attributes requested in the query (and required for further calculations). Thus, calculation scenarios can be created that can be used for various queries. With such an arrangement, a calculation scenario 150 can be created which can be reused by multiple queries even if such queries do not require every attribute specified by the calculation scenario 150. Similarly, calculation views (e.g., nodes 111-114) may be created so that they may be reused in multiple calculation scenarios 150. This reusability can provide for simplified development of database queries.

Every calculation scenario 150 can be uniquely identifiable by a name (e.g., the calculation scenario 150 can be a database object with a unique identifier or some other indicia). Accordingly, the calculation scenario 150 can be queried in a manner similar to a view in a SQL database. Thus, the query is forwarded to the calculation node 111-114 for the calculation scenario 150 that is marked as the corresponding default node. In addition, a query can be executed on a particular calculation node 111-114 (as specified in the query). Furthermore, nested calculation scenarios can be generated in which one calculation scenario 150 is used as source in another calculation scenario (e.g. via a calculation node 111-114 in this calculation scenario 150). Each calculation node 111-114 can have one or more output tables. One output table can be consumed by several calculation nodes 111-114.

Figure 2:
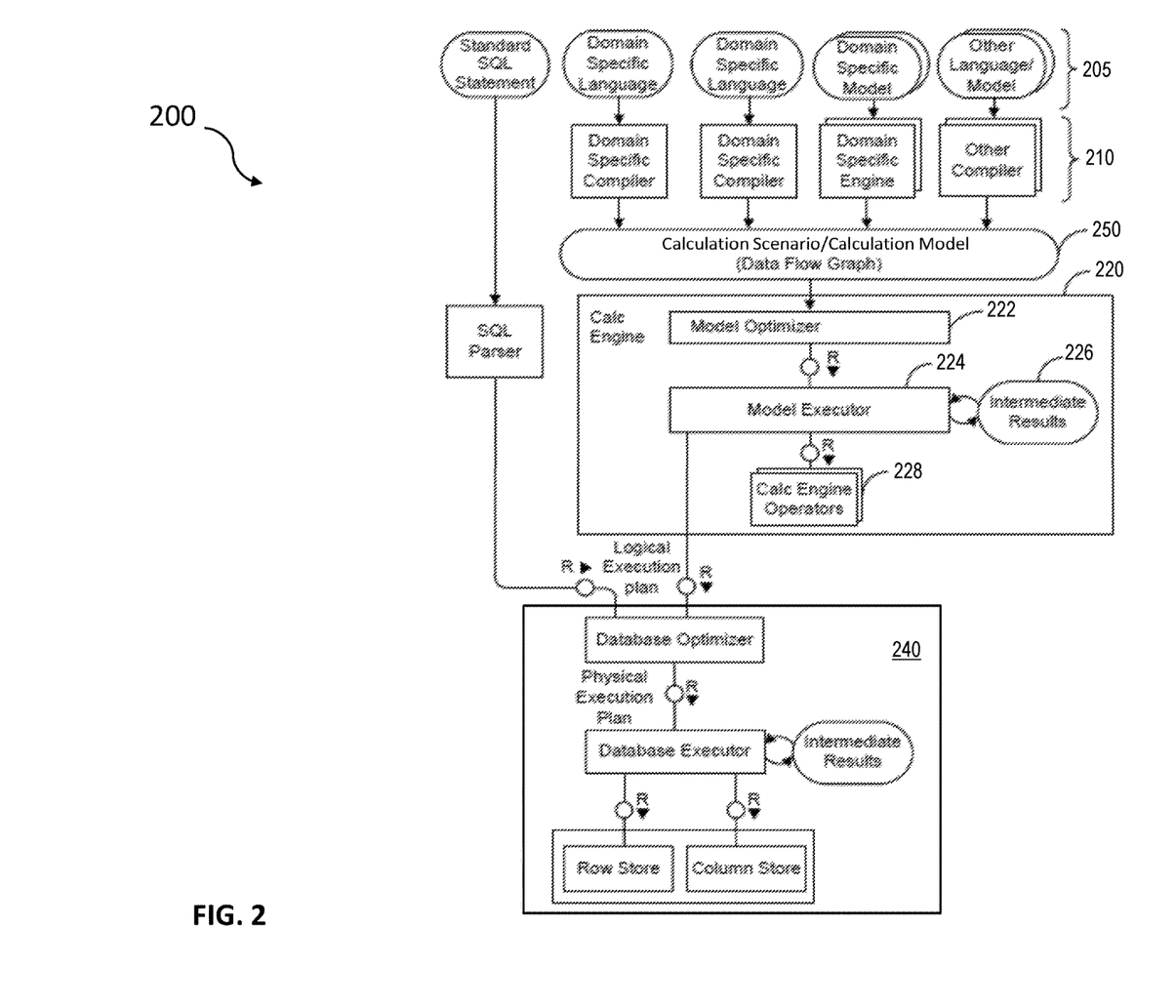
FIG. 2 is a functional block diagram illustrating a sample architecture for request processing and execution control.

FIG. 2 is a diagram illustrating a sample architecture 200 for request processing and execution control. As shown in FIG. 2, artifacts 205 in different domain specific languages can be translated by their specific compilers 210 into a common representation called a "calculation scenario" 215 (which may also be referred to as a calculation model). Calculation scenario 215 may be similar to the calculation scenario 150 of FIG. 1. To achieve enhanced performance, the models and programs written in these languages can be executed inside a database server 240 (which may be similar to the database server 140 of FIG. 1). This arrangement eliminates the need to transfer large amounts of data between the database server 240 and a client application 137, which can be executed by the application server 135. Once the different artifacts 205 are compiled into this calculation scenario 215, they can be processed and executed in the same manner. A calculation engine 220 optimizes and/or executes the calculation scenarios 215. At least a portion of the illustrated architecture 200 may be implemented as a database management system (e.g., not including the artifacts 205).

A calculation scenario 215 can be represented as a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 137 at the application server 135). Inputs can be connected to tables or to the outputs of other nodes. A calculation scenario 215 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 215 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, they can use a split. Then, the nodes can be automatically multiplied between split and merge and partition the data.

A calculation scenario 215 can be defined as part of database metadata and invoked once or multiple times. A calculation scenario 215 can be created, for example, by a SQL statement "CREATE CALCULATION SCENARIO <NAME> USING <XML or JSON>". Once a calculation scenario 215 is created, it can be queried (e.g., "SELECT A, B, C FROM <scenario name>", etc.). In some cases, databases can have pre-defined calculation scenarios 215 (e.g., defaults, those previously defined by users, etc.). Calculation scenarios 215 can be persisted in a repository (coupled to the database server 240) or in transient scenarios. Calculation scenarios 215 can also be kept in-memory.

Calculation scenarios 215 may be considered more powerful than traditional SQL queries or SQL views for many reasons. One reason is the possibility to define parameterized calculation schemas that are specialized when the actual query is issued. Unlike a SQL view, a calculation scenario 215 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 215 may contain an aggregation node containing all attributes. Later, the attributes for grouping can be supplied with the query. This allows having a predefined generic aggregation, with the actual aggregation dimensions supplied at invocation time. The calculation engine 220 can use the actual parameters, attribute list, grouping attributes, and/or the like supplied with the invocation to instantiate a query specific calculation scenario 215. This instantiated calculation scenario 215 is optimized for the actual query and does not contain attributes, nodes or data flows that are not needed for the specific invocation.

When the calculation engine 220 receives a request to execute a calculation scenario 215, it can first optimize the calculation scenario 215 using a rule based model optimizer 222. Examples for optimizations performed by the model optimizer 222 can include "push down" filters and projections so that intermediate results 226 are narrowed down earlier during compilation or execution, or the combination of multiple aggregation and join operations into one node. The optimized model can then be executed by a calculation engine model executor 224 (a similar or the same model executor can be used by the database directly in some cases). This includes decisions about parallel execution of operations in the calculation scenario 215. The model executor 224 can invoke the required operators (using, for example, a calculation engine operators module 228) and manage intermediate results 226. Most of the operators can be executed directly in the calculation engine 220 (e.g., creating the union of several intermediate results 226). The remaining nodes of the calculation scenario 215 (not implemented in the calculation engine 220) can be transformed by the model executor 224 into a set of logical database execution plans. Multiple set operation nodes can be combined into one logical database execution plan if possible.

The attributes of the incoming datasets utilized by the rules of model optimizer 222 can additionally or alternatively be based on an estimated and/or actual amount of memory consumed by the dataset, a number of rows and/or columns in the dataset, and the number of cell values for the dataset, and the like.

A calculation scenario 215 as described herein can include a type of node referred to herein as a semantic node (or sometimes semantic root node). In some aspects, a database modeler can flag the root node (output) in a graphical calculation view to which the queries of the database applications are directed as semantic node. This arrangement allows the calculation engine 220 to easily identify those queries and to thereby provide a proper handling of the query in all cases.

In various implementations, the calculation scenarios 215 may include multiproviders. As noted above, a multiprovider may be a special union operation combined with aggregation function(s), enhanced column mapping information, and/or specialized filter processing. In some aspects, filters can have another semantic when applied on the enhanced column mapping, as opposed to a union operation. With multiproviders, it is also possible to specify delta queries, which can be seen as part provider specific filter constraints.

Figure 3:
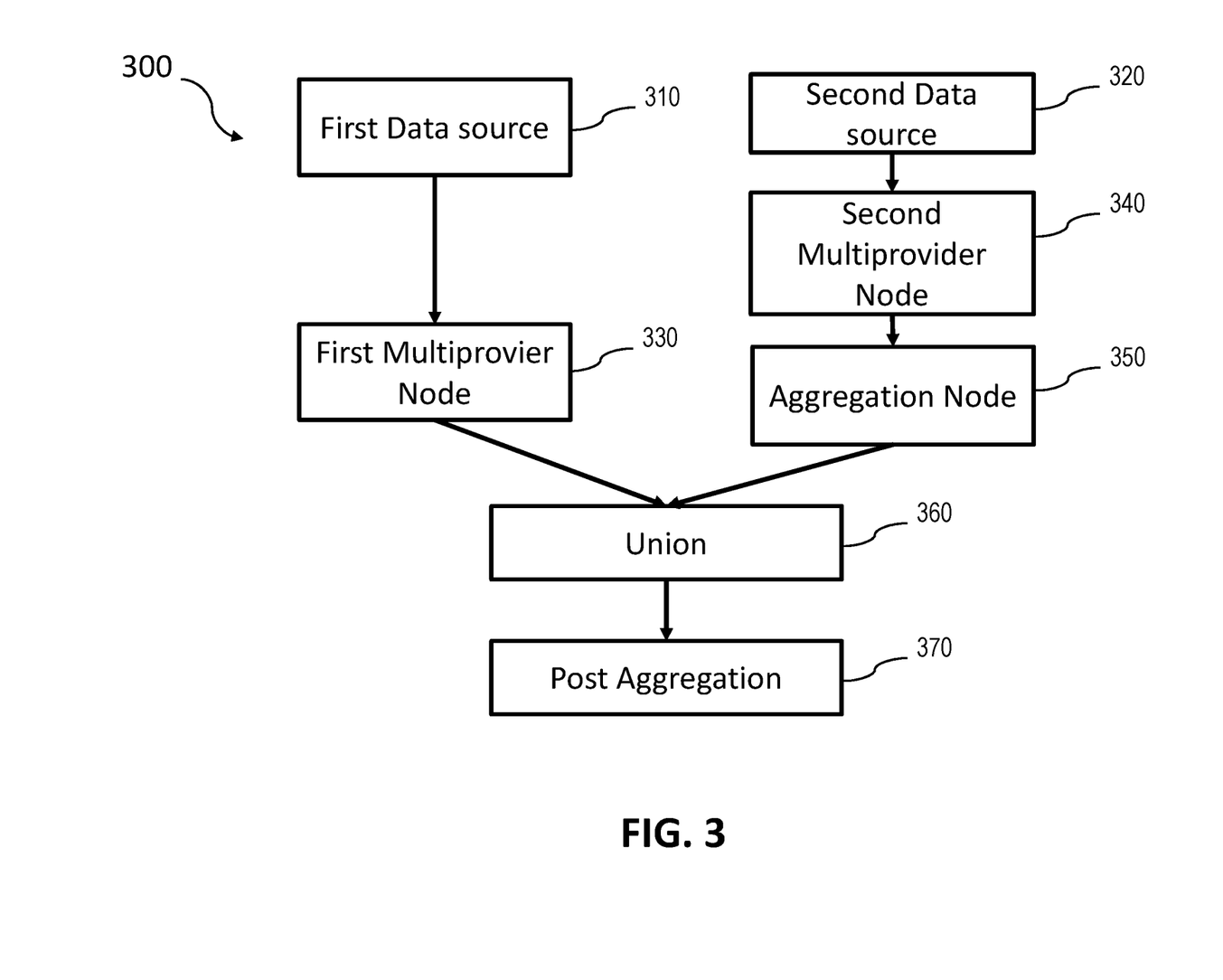
FIG. 3 is a diagram that illustrates an optimized model of a calculation scenario consistent with the current subject matter.

When executed, the multiprovider 310 may filter and aggregate the plurality of part providers for data. Each part provider is a semantic table partition that holds data (e.g., data for a specific accounting year and/or a specific account region). In certain aspects, adjacent part providers may contain overlapping data. Thus, it can be advantageous to filter the data of the part providers to avoid duplication.

Filtering and hierarchy joins are examples of a multiprovider-specific optimization. Other multiprovider-specific optimizations can include a multiprovider merge and a filter push-down. In some aspects, the calculation engine of FIG. 2 may be configured to execute or otherwise process each multiprovider-specific optimization of the calculation scenario 300. In some aspects, Field Element Selection (FEMS) filters can include filter conditions, such as for a restricted keyfigure used to convert a row-based database result set to a cell format specified by a user. If any of these conditions (or optionally, other conditions, which may be part provider-specific) are met, then the calculation engine may determine that the calculation scenario 300 is optimized, and may proceed to execute it (or pass the calculation scenario 300 to another module for execution). If not, then the calculation engine 220 may implement additional optimizations (e.g., split a multiprovider) explained with more detail with respect to FIG. 3.

In an example implementation, which is not limiting on the intended scope of the disclosure, some multiprovider data sources can include a high-speed, in-memory database (e.g., the HANA database available from SAP SE of Walldorf, Germany) and/or a Smart Data Access (SDA) database (e.g., SAP IQ, also available from SAP SE of Walldorf Germany). More generally, a first part provider included in a multiprovider may be or include a first database system having a first set of operation features, and a second part provider included in the multiprovider may be or include a second database system having a second set of operation features. For efficient query processing, the least amount of data transferred between part providers of the multiprovider is desirable. The feature set of the second database system (e.g., the SDA-based database system in the example outlined above) can be different than the feature set of the first database systems (e.g., the in-memory database such as SAP HANA in the example outlined above), which can result of inefficient simultaneous processing of HANA and SDA databases absent separation of calculation scenario functions consistent with implementations of the current subject matter.

For example, some database systems (e.g., HANA databases) can execute complex aggregation operations that include hierarchy joins as well as FEMS filters. As FEMS filter logic may only be available on some database systems, it may not be possible or efficient to use such FEMS filters in other database systems (e.g., the SDA-based database system in the example outlined above). For example, if a multiprovider operation contains a FEMS filter, a hierarchy join, a HANA local part provider, and a part provider using an SDA feature, optimized execution has not been previously achieved.

For example, optimizing for a first database system can include hierarchy joins that are not pushed to an external database (e.g., HANA execution can include executing multiproviders in a HANA OLAP engine). However, optimizing for execution of a second database system that does not include FEMS filter logic (e.g., SDA-based database systems) can include FEMS filters being applied in an additional, second step for the first data source since the second data source is unable to execute such filters. As such, additional records can require being sent over a network (e.g., between the HANA data source and the external database) and larger intermediate results may be materialized thereby reducing processing efficiency.

The following describes an optimized solution to the above issues, including a way of optimizing calculation scenarios including more than one data source that each require a different approach for optimizing operations.

FIG. 3 is a diagram that illustrates an optimized model of a calculation scenario 300 including a first data source 310 (e.g., HANA data source) and a second data source 320 (e.g., SDA data source). As shown in FIG. 3, the calculation scenario can detect and determine that a multiprovider includes at least two different data sources, such as the first data source 310 and the second data source 320. The first data source 310 and the second data source 320 can require different approaches for optimizing operations. As such, to optimize operations of both the first data source 310 and the second data source 320, the calculation scenario 300 can split the multiprovider. For example, the calculation scenario 300 can form a first multiprovider node 330 that corresponds to an optimization strategy compatible with the first data source 310. For example, the first multiprovider node 330 can include FEMS filters and hierarchy joins.

Since the second data source 320 is not compatible with at least one optimization operation that is compatible with the first data source 310, the calculation scenario 300 can form a second multiprovider node 340 that corresponds to an optimization strategy compatible with the second data source 320. For example, the second multiprovider node 330 can include hierarchy joins. The calculation scenario 300 can also form an aggregation node 350 that includes at least one additional optimization operation (e.g., FEMS filters) that is compatible with the second data source 320.

As shown in FIG. 3, the calculation engine can merge or union 360 the results from the aggregation node 350 and the first multiprovider node 330. The calculation can further perform a post-aggregation 370, as shown in FIG. 3. As such, the calculation scenario 300 illustrated in FIG. 3 can provide a more efficient way to query processing by combining the advantages of both optimization approaches, which can limit intermediate results and improve processing efficiency. Furthermore, the union 360 and post-aggregation 370 can allow the same results to be produced whether optimization is used or not.

Figure 4:
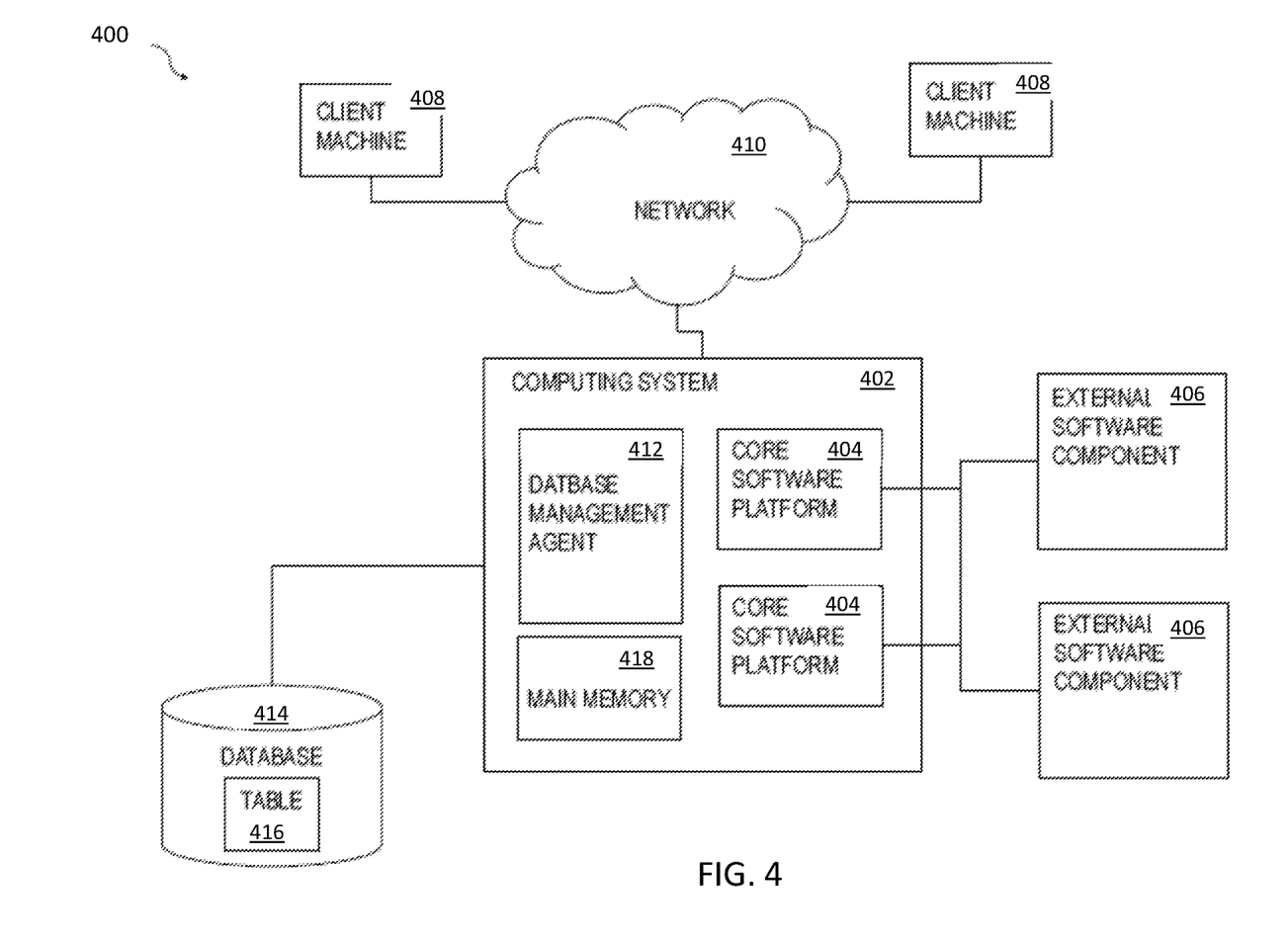
FIG. 4 is a diagram of a system that can implement one or more features consistent with the current subject matter.

FIG. 4 is a diagram of a system 400 that can implement one or more features consistent with the current subject matter. A computing system 402 can include one or more core software platform modules 404 providing one or more features of a high-level programming software system or other software that includes database management features. The computing system can also aggregate or otherwise provide a gateway via which users can access functionality provided by one or more external software components 406. One or more client machines 408 can access the computing system, either via a direct connection, a local terminal, or over a network 410 (e.g. a local area network, a wide area network, a wireless network, the Internet, or the like).

A database management agent 412 or other comparable functionality can access a database 414 that includes at least one table 416, which can in turn include at least one column. The database management agent 412 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 412 or other comparable functionality can be configured to load a database table 416, or other comparable data set, into the main memory 418. The database management agent 412 can be configured to load the information from the database 414 to the main memory 418 in response to receipt of a query instantiated by a user or computer system through one or more client machines 408, external software components 406, core software platforms 404, or the like. At least a portion of the illustrated system 400 may be implemented as a database management system (e.g., not including the client machines 408, the network 410, and/or the external software components 406). In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

Figure 5:
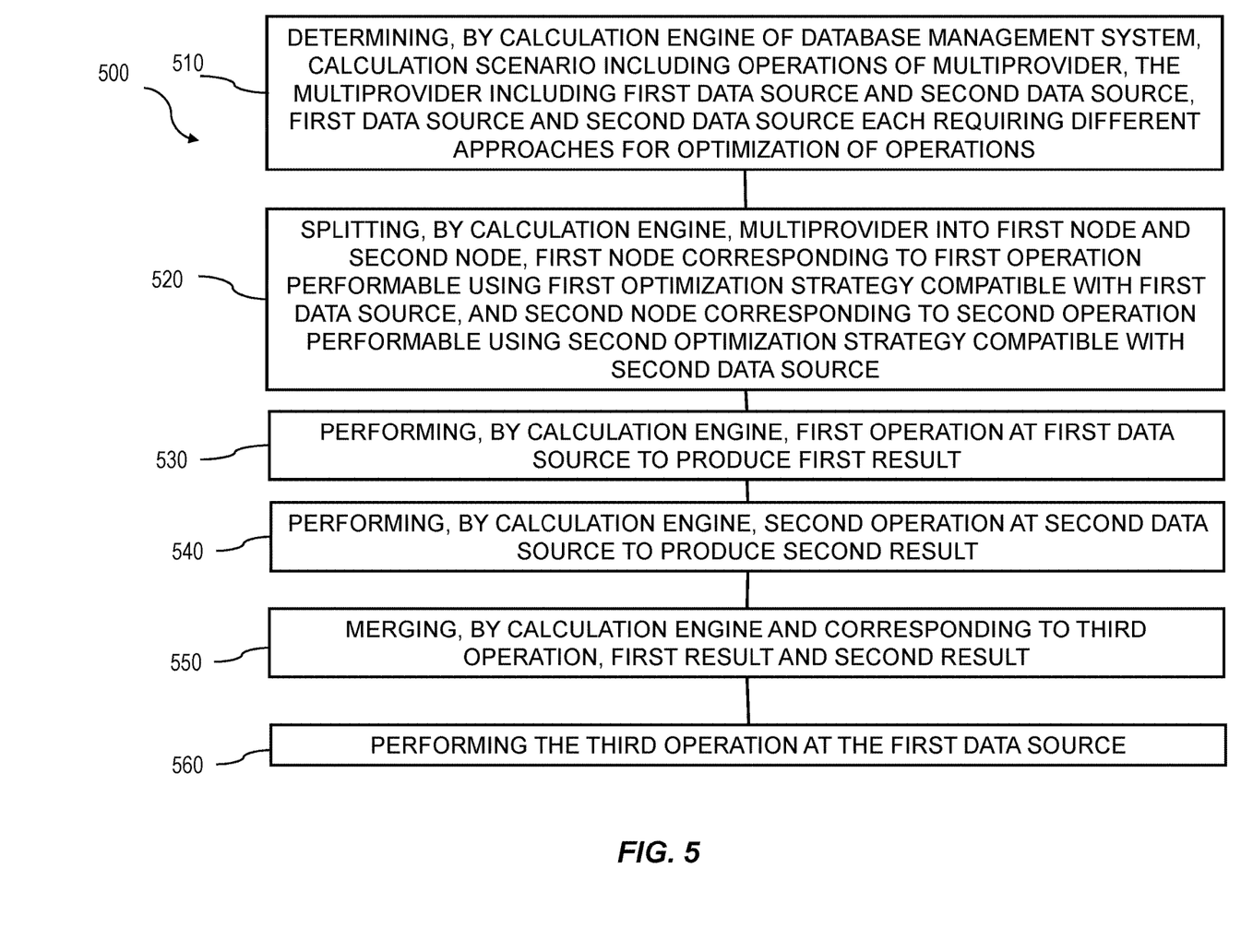
FIG. 5 is a process flow diagram illustrating an exemplary method consistent with the current subject matter.

FIG. 5 is a process flow diagram illustrating an exemplary method 500 of processing a calculation scenario for executing a query. In various implementations, the method 500 may be performed by the calculation engine 220 of FIG. 2, the computing system 402 of FIG. 4, or other hardware and/or software components described herein, or equivalents thereof. Although illustrated in linear fashion, in various implementations, the steps of the method 500 may be executed in a different order, and not all of the steps of method 500 may be required or executed.

At operational block 510 the calculation engine 220 of a database management system can determine a calculation scenario including operations of a multiprovider. The multiprovider can include a first data source and a second data source. The first data source and the second data source can each require different approaches for optimization of the operations. In some aspects, the first data source includes a HANA data source. In some aspects, the second data source includes a SDA data source.

At operational block 520 the calculation engine 220, for example, can split the multiprovider into a first node and a second node. The first node can correspond to a first operation performable using a first optimization strategy compatible with the first data source and the second node can correspond to a second operation performable using a second optimization strategy compatible with the second data source. In some aspects, the first operation can include a hierarchies join and a FEMS filter. In some aspects, the second operations can include operations performed at a first sub-node and a second sub-node. The first sub-node can correspond to a hierarchy join compatible with the second data source. The second sub-node can correspond to data aggregation and a FEMS filter compatible with the second data source.

At operational block 530 the calculation engine 220, for example, can perform the first operation at the first data source to produce a first result and, at operational block 540, perform the second operation at the second data source to produce a second result.

At operational block 550 the calculation engine 220, for example, can merge the first result and the second result according to a third operation. At operational block 560 the calculation engine 220, for example, can perform the third operation at the first data source.

In some implementations, the calculation engine can comprise at least one programmable processor and at least one memory storing instructions that, when executed by the at least one programmable processor to implement the determining, the splitting, the performing the first operation, the performing the second operation, the merging, and the performing of operational blocks 510-560.

Without in any way limiting the scope, interpretation, or application of the claims appearing below, a technical effect of one or more of the example embodiments disclosed herein is more efficient execution of complex calculation scenarios while allowing a developer to develop less complex software. For example, new software for databases may be deployed on top of currently existing software while still maintaining some of the benefits of the existing software and gaining additional benefits from the new software.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   at least one hardware data processor; and
   at least one memory storing instructions which, when executed by the at least one hardware data processor, result in operations comprising:
   determining, by a calculation engine of a database management system, an incompatibility caused by a calculation scenario including operations on a multiprovider, the multiprovider including a first data source having at least one operation that is incompatible with a second data source, such that incompatibility causes the first data source and the second data source to use, at least in part, different approaches for optimization of the calculation scenario, wherein a first node corresponding to a first operation includes a filter and a hierarchy join that are incompatible with the second data source, and wherein the least one operation comprises the first operation;
   in response to the determining of the incompatibility, splitting, by the calculation engine, the multiprovider into at least the first node and a second node, the first node corresponding to the first operation performable using a first optimization strategy compatible with the first data source but not compatible with the second, and the second node corresponding to a second operation performable using a second optimization strategy compatible with the second data source;
   performing, by the calculation engine, the first operation at the first data source to produce a first result;
   performing, by the calculation engine, the second operation at the second data source to produce a second result;
   merging, by the calculation engine, the first result and the second result into a third operation; and
   performing the third operation at the first data source.

2. The system of claim 1, wherein first data source comprises an in-memory database, and wherein the second data source comprises a smart data access database.

3. The system of claim 1, wherein the filter comprises a field element selection filter.

4. The system of claim 3, wherein the second operation comprises operations performed at a first sub-node and a second sub-node as two separate operations at the second data source, the first sub-node corresponding to the hierarchy join compatible with the second data source, and the second sub-node corresponding to data aggregation and the field element selection filter compatible with the second data source.

5. A computer-implemented method, comprising:
   at least one hardware data processor; and
   at least one memory storing instructions which, when executed by the at least one hardware data processor, result in operations comprising:
   determining, by a calculation engine of a database management system, an incompatibility caused by a calculation scenario including operations on a multiprovider, the multiprovider including a first data source having at least one operation that is incompatible with a second data source, such that incompatibility causes the first data source and the second data source to use, at least in part, different approaches for optimization of the calculation scenario, wherein a first node corresponding to a first operation includes a filter and a hierarchy join that are incompatible with the second data source, and wherein the least one operation comprises the first operation;
   in response to the determining of the incompatibility, splitting, by the calculation engine, the multiprovider into at least the first node and a second node, the first node corresponding to the first operation performable using a first optimization strategy compatible with the first data source, and the second node corresponding to a second operation performable using a second optimization strategy compatible with the second data source;
   performing, by the calculation engine, the first operation at the first data source to produce a first result;
   performing, by the calculation engine, the second operation at the second data source to produce a second result;
   merging, by the calculation engine, the first result and the second result into a third operation; and
   performing the third operation at the first data source.

6. The method of claim 5, wherein first data source comprises an in-memory database, and wherein the second data source comprises a smart data access database.

7. The method of claim 5, wherein the filter comprises a field element selection filter.

8. The method of claim 7, wherein the second operation comprises operations performed at a first sub-node and a second sub-node as two separate operations at the second data source, the first sub-node corresponding to the hierarchy join compatible with the second data source, and the second sub-node corresponding to data aggregation and the field element selection filter compatible with the second data source.

9. A non-transitory computer-readable medium storing instructions, which when executed by at least one data processor, result in operations comprising:
   determining, by a calculation engine of a database management system, an incompatibility caused by a calculation scenario including operations on a multiprovider, the multiprovider including a first data source having at least one operation that is incompatible with a second data source, such that incompatibility causes the first data source and the second data source to use, at least in part, different approaches for optimization of the calculation scenario, wherein a first node corresponding to a first operation includes a filter and a hierarchy join that are incompatible with the second data source, and wherein the least one operation comprises the first operation;
   in response to the determining of the incompatibility, splitting, by the calculation engine, the multiprovider into at least the first node and a second node, the first node corresponding to the first operation performable using a first optimization strategy compatible with the first data source, and the second node corresponding to a second operation performable using a second optimization strategy compatible with the second data source;
   performing, by the calculation engine, the first operation at the first data source to produce a first result;

performing, by the calculation engine, the second operation at the second data source to produce a second result;

merging, by the calculation engine, the first result and the second result into a third operation; and performing the third operation at the first data source.

10. The non-transitory computer-readable medium of claim 9, wherein first data source comprises an in-memory database, and wherein the second data source comprises a smart data access database.

11. The non-transitory computer-readable medium of claim 9, wherein the filter comprises a field element selection filter.

12. The non-transitory computer-readable medium of claim 11, wherein the second operation comprises operations performed at a first sub-node and a second sub-node as two separate operations at the second data source, the first sub-node corresponding to the hierarchy join compatible with the second data source, and the second sub-node corresponding to data aggregation and the field element selection filter compatible with the second data source.

* * * * *